United States Patent [19]
Peacock

[11] Patent Number: 5,184,567
[45] Date of Patent: Feb. 9, 1993

[54] AUTOMATIC INDIVIDUAL INDEXING APPARATUS FOR DAIRY PARLOR

[76] Inventor: Steven N. Peacock, P.O. Drawer 1410, Anthony, N. Mex. 88021

[21] Appl. No.: 832,850

[22] Filed: Feb. 10, 1992

[51] Int. Cl.5 ............................................. A01J 5/00
[52] U.S. Cl. .............................................. 119/14.03
[58] Field of Search ............. 119/27, 14.01, 14.02, 119/14.03, 14.04, 20

[56] References Cited

U.S. PATENT DOCUMENTS 3,792,686  2/1974  Neeham et al. ............... 119/27 X
4,010,714  3/1977  Notsuki et al. ............... 119/14.03
4,444,150  4/1984  Hueftle et al. ............... 119/27

Primary Examiner—Robert P. Swiatek
Assistant Examiner—Thomas Price
Attorney, Agent, or Firm—Shoemaker and Mattare, Ltd.

[57] ABSTRACT

Each of a series of milking stalls is bounded laterally by lateral barriers, rearwardly by a common butt plate, and at the front by a pair of pivoted gates which close rearwardly when a cow is loaded against the cow's shoulders. The gates for a particular stall are closed automatically as a cow enters the stall, brushing past a pivoted flap which triggers actuation of a pneumatic cylinder linked to the gates for that stall.

6 Claims, 2 Drawing Sheets

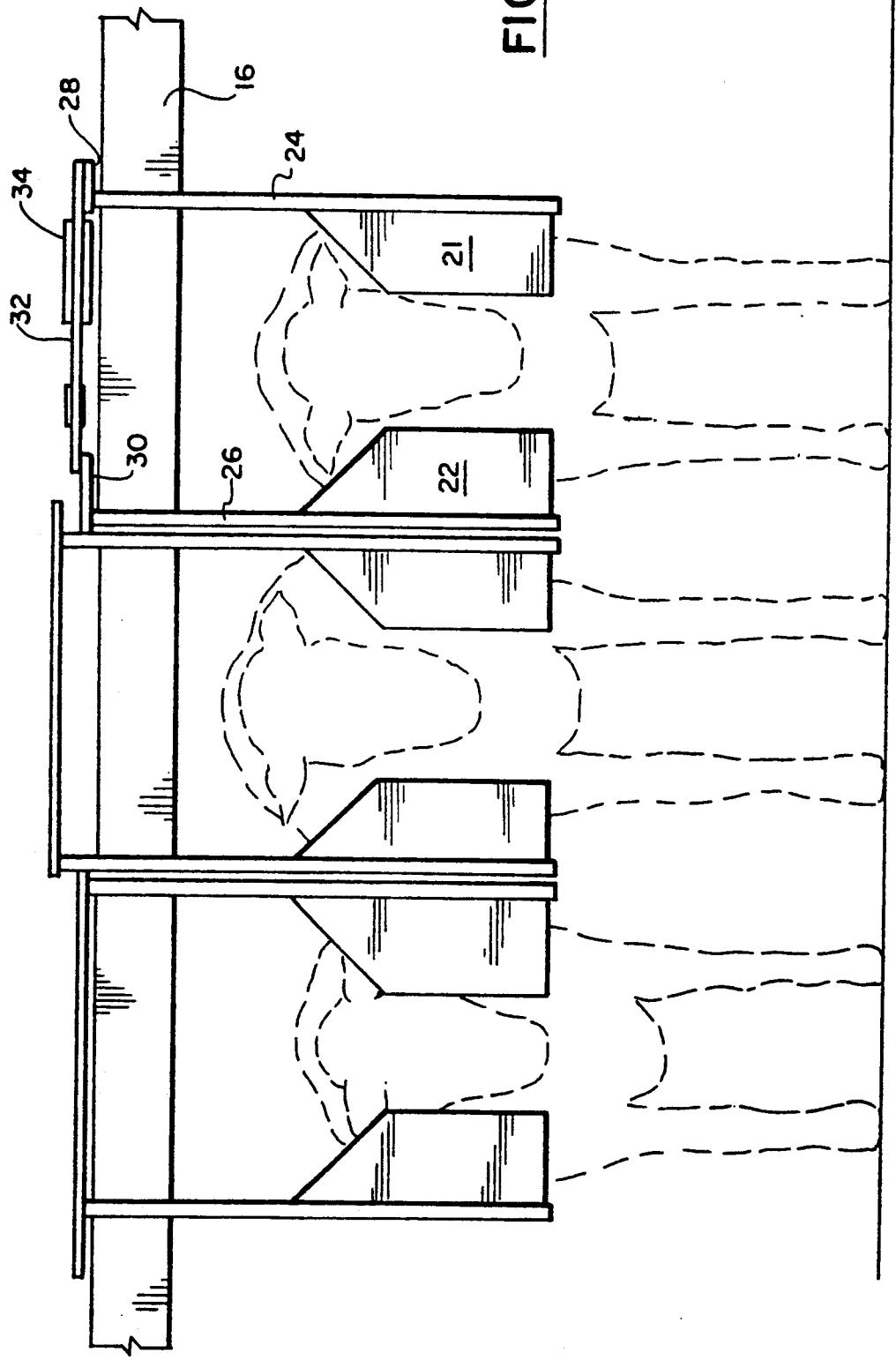

AUTOMATIC INDIVIDUAL INDEXING APPARATUS FOR DAIRY PARLOR

BACKGROUND OF THE INVENTION

This invention relates to animal confinement generally, and more particularly to an apparatus for confining cows to stalls during milking.

Large-scale modern dairies are increasingly automated. A common problem is that of loading cows into stalls for milking, and in making the cow comfortable while it is in the stall. To best utilize automatic milking equipment, it is desired that the udders of the cows be in approximately the same position, from stall to stall. However, since cows vary substantially in size, if stalls of fixed length are used, and the heads of the cows tend toward the same position in the stall, then the udders of the shorter cows will be well ahead of those of larger cows. Additionally, the smaller animals will have substantial clearance at either end, so that they may, undesirably, move fore and aft in the stall.

SUMMARY OF THE INVENTION

It is therefore an object of this invention to provide a dairy stall, or series of stalls, having an effectively variable length, each sized to fit whatever cow enters it.

Another object of the invention is to facilitate automatic milking by placing the udders of various size cows in about the same position from stall to stall.

A third object of the invention is to prevent discomfort and injury to the cows, which securely retaining each in its stall.

These and other objects of the invention are met by a dairy stall comprising a pair of lateral barriers for confining a cow laterally, a butt plate for preventing the cow from backing out of the stall, a front barrier comprising a pair of pivoted gates movable between a closed position engaging the shoulders of the cow, and a second position releasing the cow, and a closing mechanism for automatically moving both gates toward the closed position as a cow enters the stall.

BRIEF DESCRIPTION OF THE DRAWINGS

In the accompanying drawings,

FIG. 2 is a front elevational view thereof.

DESCRIPTION OF THE PREFERRED EMBODIMENT

Figure 1:
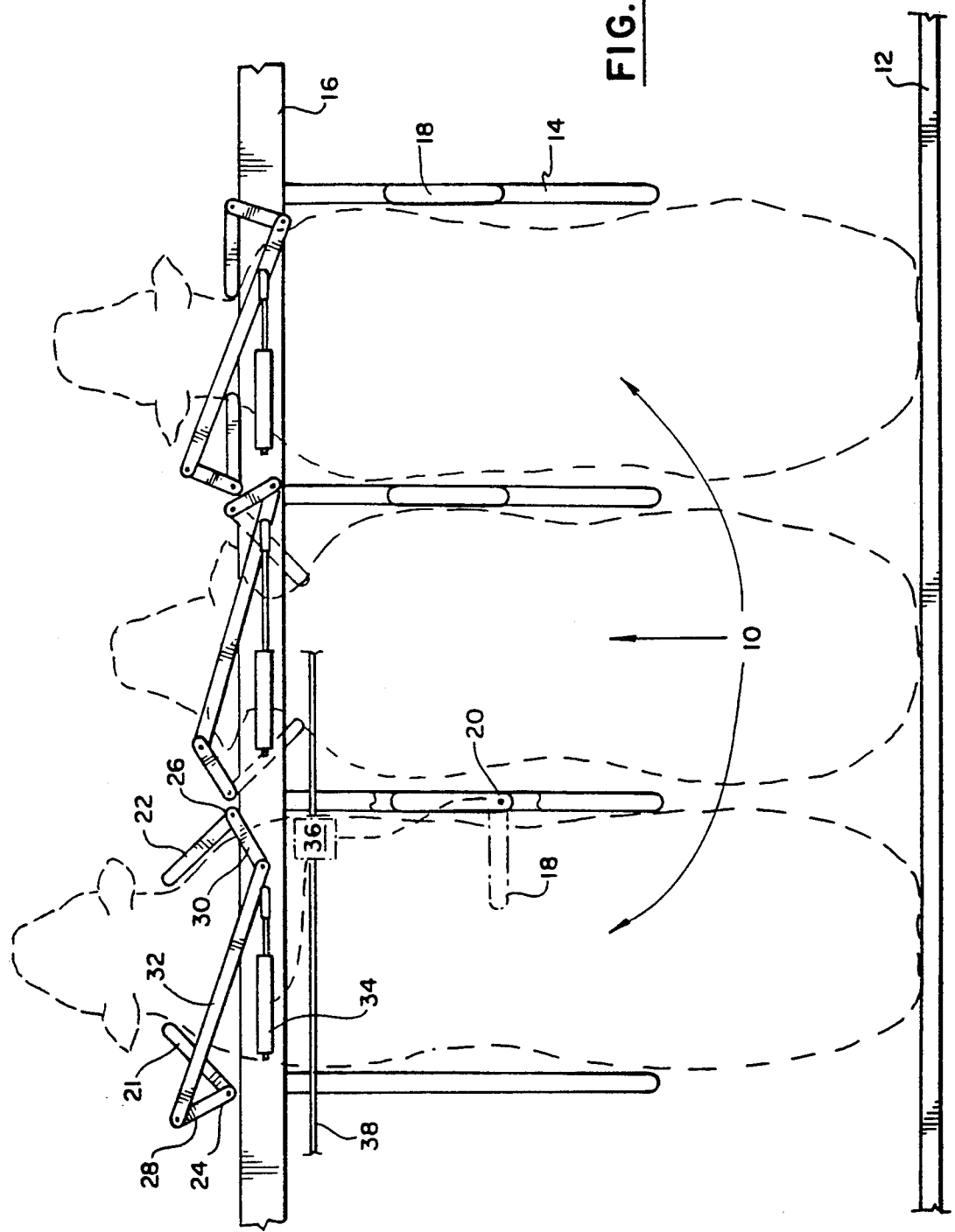
FIG. 1 is a top plan view of a stall embodying the invention.

As shown in FIGS. 1 and 2, a series of milking stalls 10 embodying the invention each comprises a stationary butt plate 12 for limiting rearward movement of the cow in its stall, and a pair of stall dividers 14. All the dividers are affixed to a common frame 16, which may be provided with means (not shown) for raising all the dividers at once when the cows are to be released.

Each of the dividers 14 has a flap or trigger 18 mounted thereon on a vertical hinge axis 20. The flaps are biased toward the position shown in broken lines in FIG. 1 by a spring or other mechanism, not shown. As a cow enters the stall, it pushes the flap to the position shown in solid lines, triggering the mechanism described below.

During milking, the cows are prevented from pushing forward out of their stalls by a pair of gates 21, 22, each of which is mounted to the frame 16 for pivoting movement about a respective axis 24, 26. Each gate is welded to an actuating arm 28, 30 with which it forms an acute angle. In each stall, one of the arms 28 extends forward from its gate, while the other arm 30 extends rearward. The ends of the arms 28, 30 are interconnected by pinned connections to a common, horizontal, rigid link 32, which is driven laterally by a linear motor such as a pneumatic cylinder 34.

As the drawings show, the gate design permits cows of various sizes to be accommodated; three sizes of cow are shown. FIG. 2 shows how the gap between the free edges of the gates varies, with cow size. Although dimensions and geometry may vary somewhat, the following dimensions have proven satisfactory so far: each gate is nine inches wide, and the gate pivot axes for a particular stall are twenty-seven inches apart. Thus, when the gates are coplanar (far right in FIG. 1) the gap between them is about nine inches, wider than the neck of the cow; the other two stalls, with the gates about 40° from a common plane, have a gap of about twelve inches, still narrow enough to keep the cow in the stall.

Each flap triggers operation of its respective gate cylinder—one such controller 36 is shown diagrammatically in FIG. 1. Because the controllers are independent from one another, the stalls can be loaded independently. The pressure in the common air line 38 is selected to be low enough to prevent discomfort to the cow, yet sufficient to prevent or discourage the cow from pushing out of the stall.

During milking, the udders of the cows are in about the same location from stall to stall, since the butt plates have a common plane.

When milking is finished, the gates can be opened simultaneously by releasing pressure in the common air line 38 to the cylinders. Additionally, and preferably, the frame may be raised, completely lifting the stall structure above the cow. This is conventional in modern milking stall apparatus. As the cow leaves the stall, or the stall is lifted out of contact with the cow, the flaps move back to their initial protruding positions.

Inasmuch as the invention is subject to modifications and variations, it is intended that the foregoing description and the accompanying drawings shall be interpreted as illustrative of only one form of the invention, whose scope is to be measured by the following claims.

I claim:

1. A dairy stall comprising
   a pair of lateral barriers for confining a cow laterally,
   a butt plate for preventing the cow from backing out of the stall, and
   a front barrier comprising a pair of pivoted gates movable between a closed position engaging the shoulders of the cow, and a second position releasing the cow, and
   a closing mechanism for automatically moving both gates toward said closed position when a cow enters the stall,
   a flap pivotally mounted on one of said lateral barriers, said flap being biased toward a position protruding into said stall, and being deflectable upon contact with a cow to a deflected position, and means for actuating said closing mechanism when said flap is deflected to said deflected position.

2. The invention of claim 1, wherein each of the gates has an actuating arm affixed thereto, one such arm extend forward of its gate, and the other arm extending rearward from its gate, the arms having ends interconnected by a rigid link, and the closing mechanism comprising a linear motor for driving the link laterally in a direction closing said gates.

3. The invention of claim 2, wherein said linear motor is a pneumatic cylinder driven by compressed air at a pressure sufficient to retain the cow in its stall, but insufficient to cause gate closure to injure the cow.

4. An automatic indexing mechanism for a dairy, comprising a series of stalls, each comprising
   a pair of lateral barriers for confining a cow laterally,
   a butt plate for preventing the cow from backing out of the stall, and
   a front barrier comprising a pair of pivoted gates movable between a closed position engaging the shoulders of the cow, and a second position releasing the cow,
   a closing mechanism for automatically moving both gates toward said closed position when a cow enters the stall, and
   a flap pivotally mounted on one of said lateral barriers, said flap being biased toward a position protruding into said stall, and being deflectable upon contact with a cow to a deflected position, and means for actuating said closing mechanism when said flap is deflected to said deflected position.

5. The invention of claim 4, wherein each of the gates has an actuating arm affixed thereto, one such arm extend forward of its gate, and the other arm extending rearward from its gate, the arms having ends interconnected by a rigid link, and the closing mechanism comprising a linear motor for driving the link laterally in a direction closing said gates.

6. The invention of claim 5, wherein said linear motor is a pneumatic cylinder driven by compressed air at a pressure sufficient to retain the cow in its stall, but insufficient to cause gate closure to injure the cow.

* * * * *